US012270792B2

(12) United States Patent
Tyagi et al.

(10) Patent No.: US 12,270,792 B2
(45) Date of Patent: Apr. 8, 2025

(54) SCRATCH TESTER FOR ADHESION TESTING OF COATINGS ON SURFACES

(71) Applicant: University of the District of Columbia, Washington, DC (US)

(72) Inventors: Pawan Tyagi, Derwood, MD (US); Wondwosen Demisse, Hyattsville, MD (US)

(73) Assignee: University of the District of Columbia, Washington, DC (US)

( * ) Notice: Subject to any disclaimer, the term of this patent is extended or adjusted under 35 U.S.C. 154(b) by 0 days.

(21) Appl. No.: 17/838,502

(22) Filed: Jun. 13, 2022

(65) Prior Publication Data

US 2022/0397503 A1    Dec. 15, 2022

Related U.S. Application Data

(60) Provisional application No. 63/209,982, filed on Jun. 12, 2021.

(51) Int. Cl.
*G01N 3/46* (2006.01)
(52) U.S. Cl.
CPC ....... *G01N 3/46* (2013.01); *G01N 2203/0078* (2013.01); *G01N 2203/0226* (2013.01)
(58) Field of Classification Search
CPC ............. G01N 3/46; G01N 2203/0078; G01N 2203/0226; G01N 3/42; G01N 2203/0082
USPC .................. 73/78, 81, 82, 105; 33/556, 558
See application file for complete search history.

(56) References Cited

U.S. PATENT DOCUMENTS 3,899,931 A * 8/1975 Iwasaki ................ G01N 3/44
73/78

FOREIGN PATENT DOCUMENTS

| EP | 2780689 B1 * | 1/2017 | ............ G01N 3/40 |
| WO | WO-2013148204 A1 * | 10/2013 | ............ G01N 3/04 |
| WO | WO-2013158387 A1 * | 10/2013 | ............ G01N 3/46 |
| WO | WO-2015017765 A2 * | 2/2015 | ............ B23P 19/04 |

* cited by examiner

*Primary Examiner* — Robert R Raevis
(74) *Attorney, Agent, or Firm* — Whiteford, Taylor & Preston, LLP; Peter J. Davis

(57) ABSTRACT

A scratch testing apparatus comprises a lightweight frame assembly and a test specimen support stage that may hold a test specimen (i.e., the material to be subjected to a scratch test) and may be horizontally moved along slide rails mounted to the frame assembly. A stylus is mounted to a load block and points toward the test specimen support stage to enable the stylus (under load from the load block) to impart a scratch to the surface of the specimen during a scratch test. A load assembly is pivotably mounted to the frame and pivotably supports the load block and stylus, with a moveable counterweight assembly positioned at an opposite end of the load assembly. The position of the counterweight may be varied along the load assembly so as to modify the amount of force exerted by the load block, and thus by the stylus, on the surface of the test specimen, even during the conduct of a scratch test. In certain configurations, various spring members may extend between the frame and the load assembly to provide further stabilization to the load assembly during scratch test operations.

18 Claims, 10 Drawing Sheets

SCRATCH TESTER FOR ADHESION TESTING OF COATINGS ON SURFACES

CROSS REFERENCE TO RELATED APPLICATIONS

This application is based upon and claims the benefit of U.S. Provisional Application No. 63/209,982 titled "Scratch Tester for Adhesion Testing of Coatings on Surfaces," filed with the United States Patent & Trademark Office on Jun. 12, 2021, the specification of which is incorporated herein by reference in its entirety.

FIELD OF THE INVENTION

This invention is directed to systems and methods for surface testing of adhesion coatings, and more particularly to systems and methods for performing scratch testing on a surface under varying load conditions.

BACKGROUND OF THE INVENTION

Various electronic and engineering components are provided with thin-film coatings, which may play an important role in protecting those components, particularly in harsh operating conditions (such as corrosive environments, high temperatures, and the like). The durability of those coatings may have a significant effect on the long-term durability of those components themselves, and understanding the durability of those components is likewise critical in overall system design. Thus, measuring the durability of the coatings is likewise important in the overall system design process.

A variety a methods have previously been employed to evaluate the durability and overall quality of such thin-film coatings, which evaluation methods typically test adhesiveness between the component and the thin-film coating that has been applied to that component. One such previously employed method comprises scratch testing, which method evaluates the critical load that is necessary to form a scratch on a coated surface using a sharp tip that engages the surface at various loads. Unfortunately, such prior methods have struggled with determining the precise load at which such coatings begin to rupture. Moreover, despite the fact that such components themselves are frequently subjected to harsh environments, previous methods have generally failed to evaluate the combined effects of temperature variations or extremes and of vibrations on scratch formation, in addition to other properties that may be important to consider to fully understand the quality and durability of the coating.

Scratches may also result from surfaces being exposed to, for example, heavy moving loads, which may be problematic in those situations in which surface appearance or residual strength of the scratched surface are important considerations. Using a scratch testing device, scratches may be made on samples of such surface to provide an understanding of the material properties and surface characteristics of such materials.

Unfortunately, there are relatively limited systems and methods that have been available for surface testing and analysis, and previously employed systems and methods for doing so have had various disadvantages. For example, previously known scratch testing systems and methods have generally yielded inconsistent data and results and have exhibited difficulty in providing consistently repeatable results. By way of example, stylus used in previously employed scratch testing systems and methods have been known to skip or jump during the test, which may contribute to inconsistent test results, making it difficult to obtain an accurate comparison of differing test runs and test samples. Likewise, both the speeds of creating a scratch and the loads that may be applied by the stylus onto the surface that is being subjected to scratch testing have been largely static, making it difficult to study and understand the effects of differing speeds and loads in creation of a scratch on a given surface. Even further, conventional devices have generally been limited in their ability to test in the actual environments that the surface under testing will experience (e.g., temperature and mechanical vibrations). This issue may be quite important, as different temperatures and mechanical vibrations may cause premature failure of coatings at unexpected loads.

Therefore, there remains a need in the art for improved systems and methods for surface testing, and particularly scratch testing of surfaces. In addition, there is a need for improved surface testing systems and methods that ensure that reliable and repeatable test results may be obtained. Further, there remains a need in the art for surface testing systems and methods that enable conducting scratch testing with variable, controlled loads and at variable scratch speeds. Still further, there remains a need in the art for economical scratch testers that may be obtained by a variety of users, such as for us in product development processes and in-house product and surface testing applications. There is still further a need in the art for a compact, portable scratch tester that may easily be transported from place to place, such as to field sites, or where multiple units might be involved in manufacturing a component for rapid diagnosis of the impact of varied manufacturing steps (e.g., in the case of an additively manufactured component that may be subjected to staged manufacturing processes at varied locations, such as smoothening, coating, heat treating, etc.). Even further, there remains a need in the art for compact systems for scratch testing that enable the study of the effect of varied environmental conditions on coatings. Still further, there remains a need in the art for systems and methods capable of testing coatings on non-flat surfaces, such as paints and coatings that are applied on curved or cylindrical surfaces.

SUMMARY OF THE INVENTION

Disclosed herein are systems and methods for performing scratch testing on a surface that addresses one or more disadvantages of prior art systems and methods. In accordance with certain aspects of an embodiment, the scratch tester allows the determination of the accurate load at which a film or other coating on a surface starts to rupture, which system delivers reproducible quantitative analysis results. Scratch testing is generally used for insight into materials to determine their resistance to abrasion and wear of modern composite materials and automotive paints, varnishes and coatings. Scratch testing may evaluate adhesion, coating thickness, substrate mechanical properties, interfacial bond strength, and test conditions such as scratch speed, load, and wear strength of surfaces in laboratory environments. A scratch tester configured in accordance with aspects of the invention enables such scratch testing processes to be carried out in an affordable, compact, lightweight but durable assembly that ensures high repeatability in creating a scratch on a given surface.

A scratch tester configured in accordance with aspects of the invention may comprise a lightweight frame assembly which may be formed by way of non-limiting example of aluminum, a test specimen support stage that may hold a test specimen (i.e., the material to be subjected to a scratch test) and may be horizontally moved along slide rails mounted to the frame assembly. A stylus is mounted to a load block and points toward the test specimen support stage to enable the stylus (under load from the load block) to impart a scratch to the surface of the specimen during a scratch test. A load assembly is pivotably mounted to the frame and pivotably supports the load block and stylus, with a moveable counterweight assembly positioned at an opposite end of the load assembly. The position of the counterweight may be varied along the load assembly so as to modify the amount of force exerted by the load block, and thus by the stylus, on the surface of the test specimen, even during the conduct of a scratch test. In certain configurations, various spring members may extend between the frame and the load assembly to provide further stabilization to the load assembly during scratch test operations. Optionally, the scratch tester may also be configured to enable temperature variations to be applied to the test specimen in order to perform scratch testing at different temperatures. Likewise, the scratch tester may also optionally enable the application of vibrations on the sample under test to study the effect of vibration in the environment on the coating adhesion properties.

In accordance with certain aspects of an embodiment of the invention, a scratch testing apparatus is provided comprising a frame, a test specimen support stage moveably mounted on the frame, a scratch stylus pivotably mounted on the frame and positioned to engage a specimen on the test specimen support stage so as to create a scratch on the specimen; and an adjustable load configured to modify a vertical load applied to the scratch stylus.

In accordance with further aspects of an embodiment of the invention, a scratch testing apparatus is provided comprising a frame having a horizontal portion and a vertical portion, a test specimen support stage moveably mounted on the horizontal portion of the frame, and a stepper motor rotating a drive screw that engages the test specimen support stage to move the specimen support stage upon rotation of the drive screw, and a load block pivot mount pivotably mounted to the vertical portion of the frame, the load block pivot mount having a load block rigidly attached to the load block pivot mount, the load block mounting a scratch stylus in a direction of the test specimen support stage, and the load block pivot mount moveably mounting a counterweight moveable toward and away from the load block pivot mount to modify a vertical load that is applied to the scratch stylus.

Still other aspects, features and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The numerous advantages of the present invention may be better understood by those skilled in the art by reference to the accompanying drawings in which.

DETAILED DESCRIPTION

Figure 1:
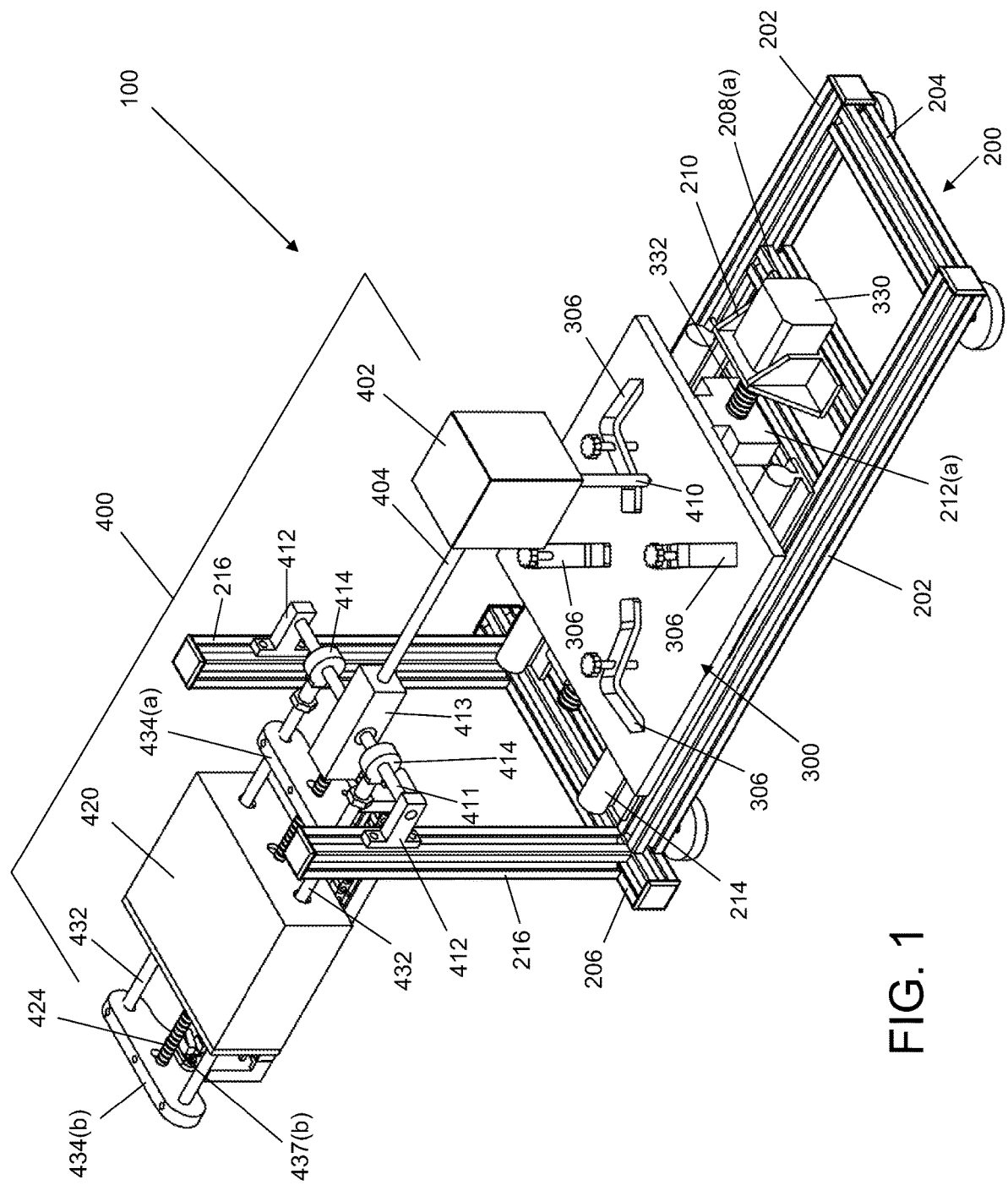
FIG. 1 is a front perspective view of a scratch test apparatus according to certain aspects of an embodiment of the invention.
Figure 2:
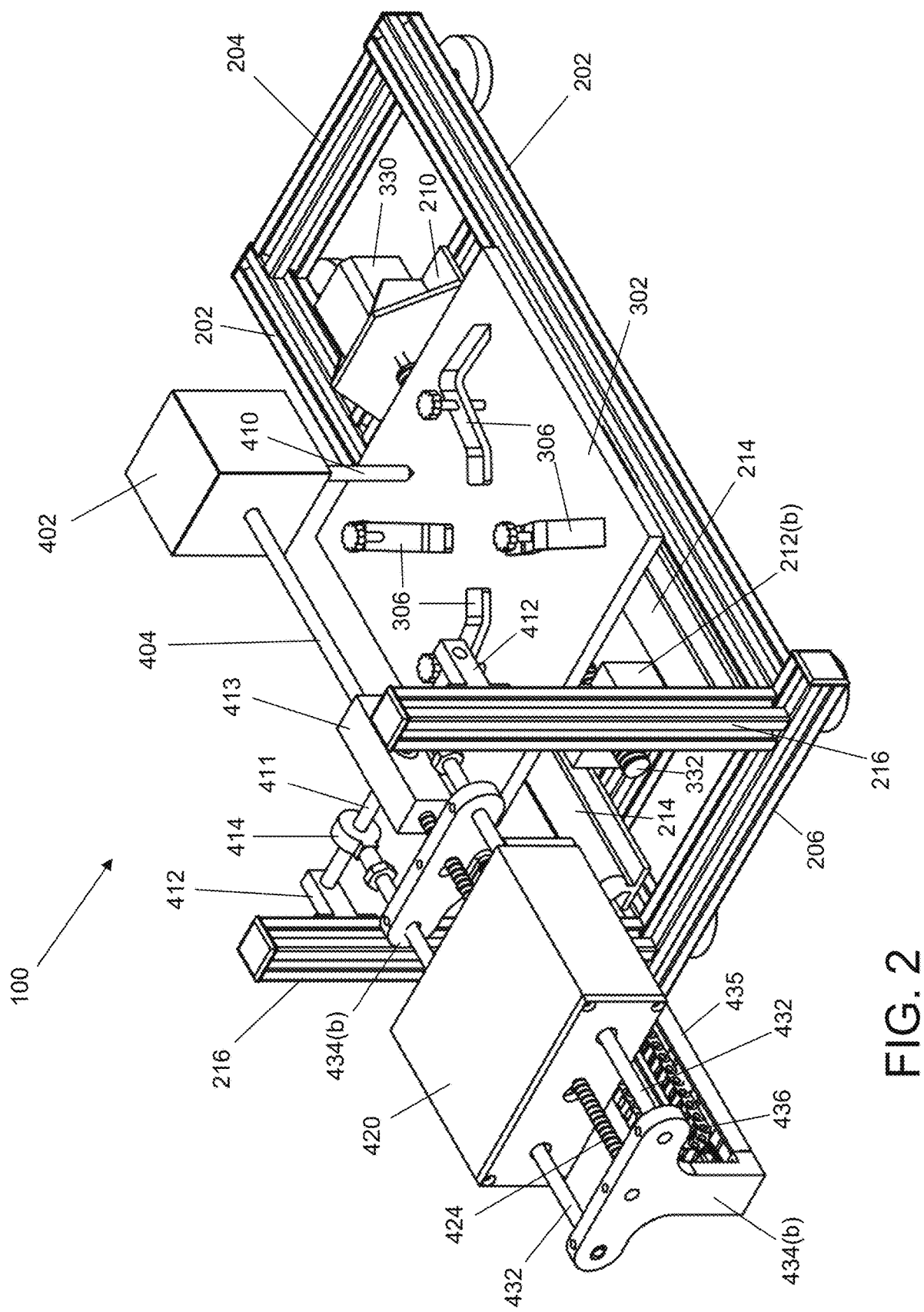
FIG. 2 is a rear perspective view of the scratch test apparatus of FIG. 1.
Figure 3:
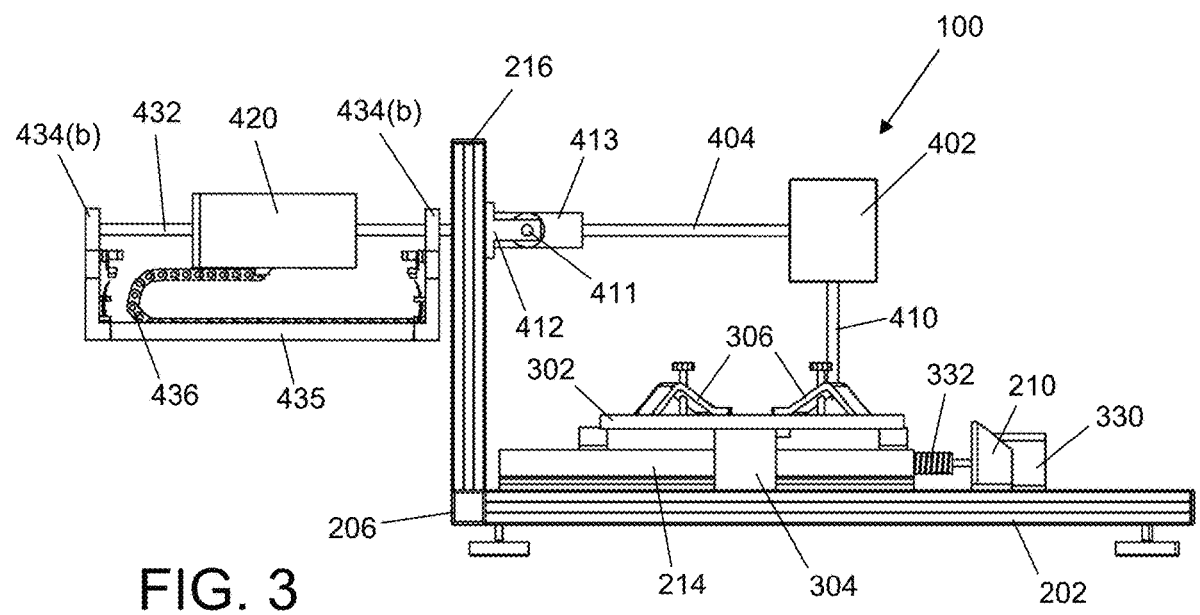
FIG. 3 is a side view of the scratch test apparatus of FIG. 1.
Figure 4:
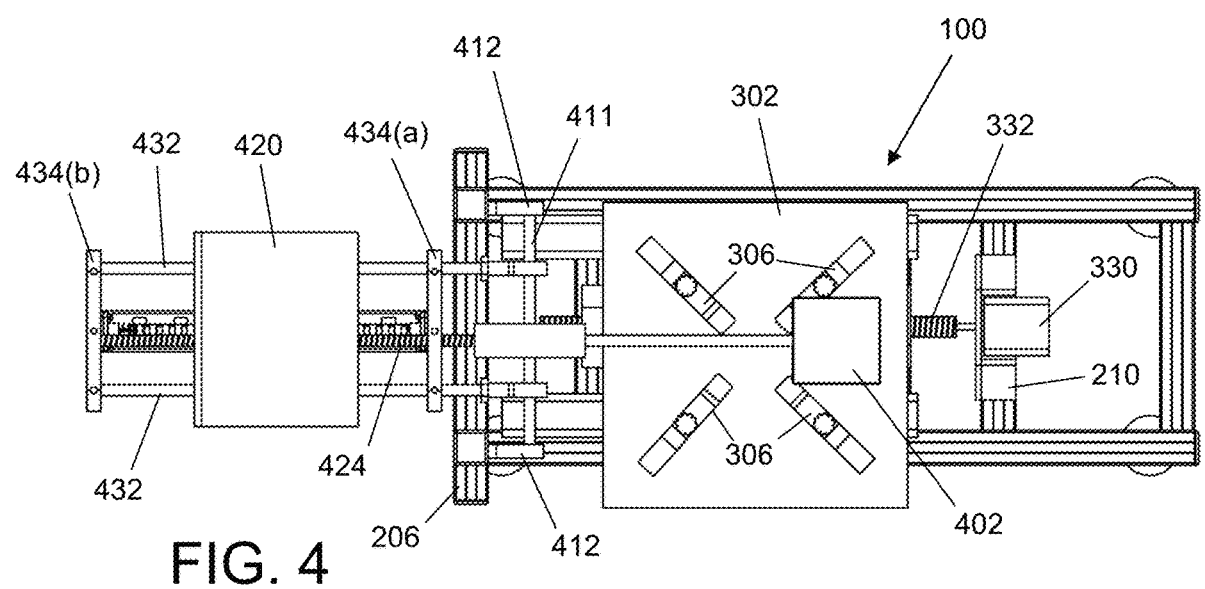
FIG. 4 is a top view of the scratch test apparatus of FIG. 1.

The invention summarized above may be better understood by referring to the following description, claims, and accompanying drawings. This description of an embodiment, set out below to enable one to practice an implementation of the invention, is not intended to limit the preferred embodiment, but to serve as a particular example thereof. Those skilled in the art should appreciate that they may readily use the conception and specific embodiments disclosed as a basis for modifying or designing other methods and systems for carrying out the same purposes of the present invention. Those skilled in the art should also realize that such equivalent assemblies do not depart from the spirit and scope of the invention in its broadest form.

Descriptions of well-known functions and structures are omitted to enhance clarity and conciseness. The terminology used herein is for the purpose of describing particular embodiments only and is not intended to be limiting of the present disclosure. As used herein, the singular forms "a", "an" and "the" are intended to include the plural forms as well, unless the context clearly indicates otherwise. Furthermore, the use of the terms a, an, etc. does not denote a limitation of quantity, but rather denotes the presence of at least one of the referenced items.

The use of the terms "first", "second", and the like does not imply any particular order, but they are included to identify individual elements. Moreover, the use of the terms first, second, etc. does not denote any order of importance, but rather the terms first, second, etc. are used to distinguish one element from another. It will be further understood that the terms "comprises" and/or "comprising", or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Although some features may be described with respect to individual exemplary embodiments, aspects need not be limited thereto such that features from one or more exemplary embodiments may be combinable with other features from one or more exemplary embodiments.

In accordance with certain aspects of an embodiment and with reference to FIGS. 1-4, a scratch test apparatus 100 is provided having in principal configuration a frame 200, a test specimen support stage 300 that is moveable with respect to frame 200, and a load assembly 400 configured to apply a load via a scratching stylus 410 to a test specimen positioned on specimen support stage 300 during a scratch test. The scratch test apparatus 100 enables variation of load during scratching (i.e., as the test specimen mounted on the test specimen support stage 300 moves under the stylus 410) in order to enable the optimum weight/load ratio to be determined and maintained for scratching a target surface. The load assembly 400 applies the lever rule, such that the load on the stylus 410 increases or decreases based on the direction in which a counterweight 420 of load assembly 400 is moved, as further detailed below. A first computer controlled motor drive 330 (which may be controlled via a simple processor, such as a readily commercially available and readily programmable Raspberry Pi processor) moves a test specimen on test specimen support stage 300 under stylus 410, while a second computer controlled motor drive 422 (FIGS. 8 and 9, discussed in greater detail below) moves counterweight 420 along load assembly 400 to vary the load, such as by way of non-limiting example from 1-50 N, which is applied from the start to the end of a prespecified scratch length. That prespecified scratch length may be input into a computer controller (not shown) along with a specified speed of scratching, which control factors may then be transmitted to each motor drive 330 and 422, with the computer controller managing the speed of each of test specimen support stage 300 and counterweight 420 to ensure that the load on stylus 410 changes synchronously with movement of the test specimen support tray 300. The computer controller may then create output showing scratch length versus applied load (e.g., in a graphical plot format) in order to identify the conditions at which the optimum scratch profile starts to appear. An operator may then select the optimum load for other tests on a similar sample or group of samples.

Figure 5:
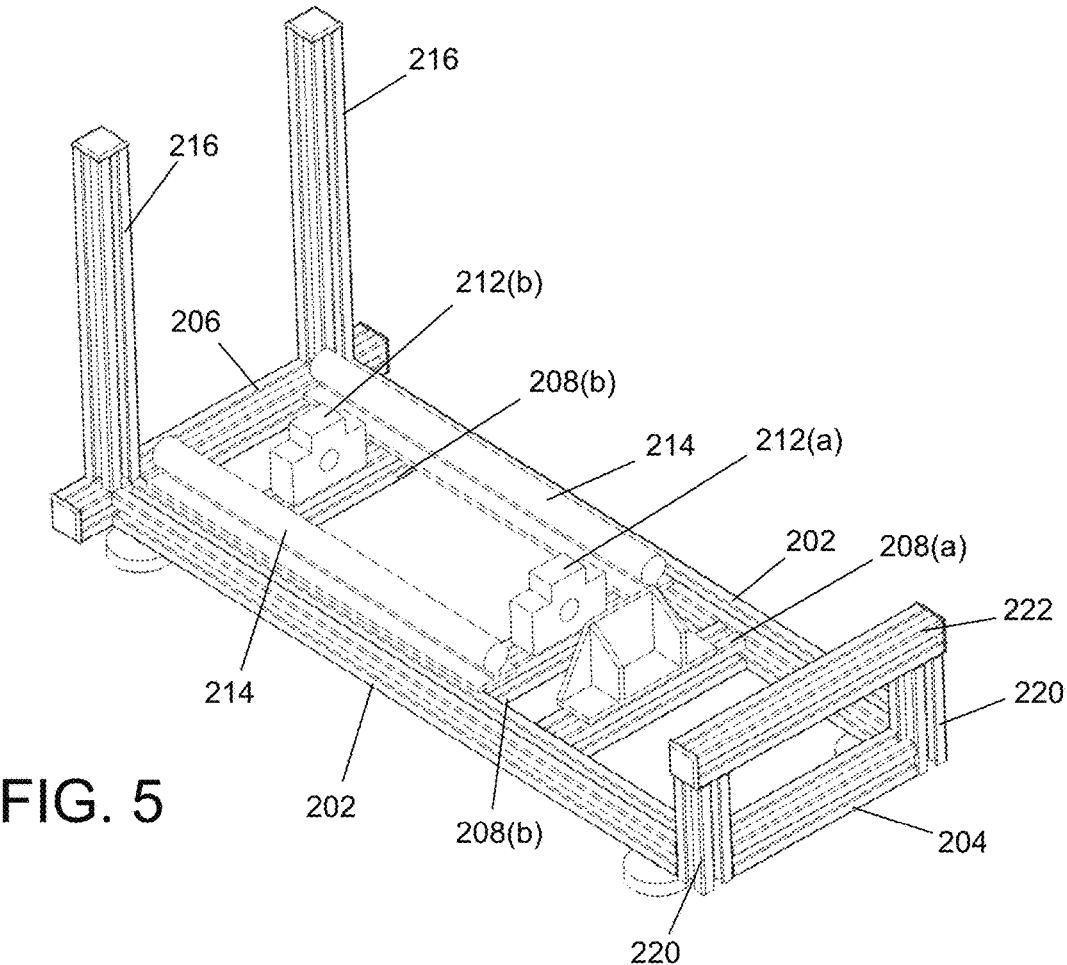
FIG. 5 is a perspective view of a frame for use in the scratch test apparatus of FIG. 1.

With continuing reference to FIGS. 1-4 and the close-up view of FIG. 5, frame 200 includes frame side legs 202, frame front end leg 204, and frame back-end leg 206 to form a generally rectangular base for the rest of scratch test apparatus 100. Frame cross-members 208(a) and 208(b) extend across the interior width of the bottom of frame 200, with frame cross-member 208(a) forming a mount for drive screw motor support 210 (which holds drive screw motor 330). Likewise, each frame cross-member 208(b) forms a mount for one each of front drive screw support block 212(a) and rear drive screw support block 212(b), each of which hold drive screw 332 in a manner allowing free rotation of drive screw 332 therethrough, and optionally support a bottom of test specimen support stage 300 as it travels longitudinally along frame 200. Slide rails 214 likewise extend longitudinally along the top edge of each frame side leg 202, and providing a guide surface along which test specimen support stage 300 may move during a scratch test procedure, as discussed in greater detail below. Further, vertical frame members 216 extend upward from the top surface of frame back-end leg 206 for ultimate pivotal mounting of load assembly 400, as discussed in greater detail below.

Each of frame side legs 202, frame front end leg 204, frame back end leg 206, frame cross-members 208(a) and 208(b), and vertical frame members 216 are preferably formed from a 30 mm aluminum extrusion profile, providing scratch test apparatus 100 a lightweight foundational support that is easy to assemble, while nonetheless assuring the necessary structural rigidity necessary to ensure proper and stable operation of scratch test apparatus 100.

Figure 6:
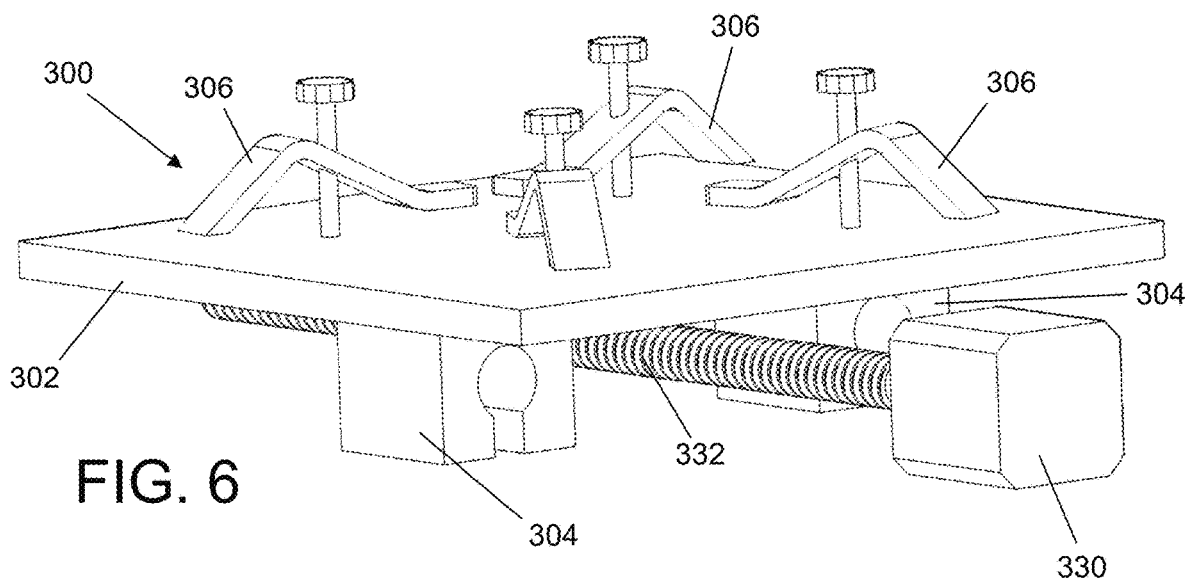
FIG. 6 is a perspective view of a test specimen support stage for use in the scratch test apparatus of FIG. 1.

With continuing reference to FIGS. 1-4 and the close-up view of FIG. 6, test specimen support stage 300 includes generally planar stage platform 302 and slider blocks 304 mounted to an underside of stage platform 302, each of which is configured for sliding along one of slide rails 214. Screw drive motor 330, which in a preferred embodiment comprises a stepper motor, engages drive screw 332 to rotate drive screw 332. Likewise, drive screw 332 engages a ball nut of standard configuration (not shown) mounted to the underside of stage platform 302. In this configuration, the linear slide rails 214 engaging slider blocks 304 and the ball screw assembly of drive screw 332 engaging the ball nut on the underside of stage platform 302 together convert rotational motion of drive screw 332 from screw drive motor 330 to linear motion of stage platform 302 along the longitudinal axis of frame 200. A plurality of test specimen clamps 306 are positioned on the top face of stage platform 302 for holding a test specimen during a scratch test operation. Scratch test apparatus 100, and particularly test specimen support stage 300, is configured to enable horizontal movement of a test sample positioned on the test specimen support stage 300 at a speed of up to 300 mm/sec to enable testing as per ASTM and ISO standards. Screw drive motor 330 preferably comprises a low noise stepper motor, and the central position of the stepper screw drive motor 330 enables stabilized low noise movement.

In a particularly preferred embodiment, stage platform 302 may be manufactured using a LulzBot TAZ 6 plastic 3D printer with the print medium comprising polyethylene terephthalate (PETG), which material was found to provide a particularly strong and ductile filament.

Figure 7:
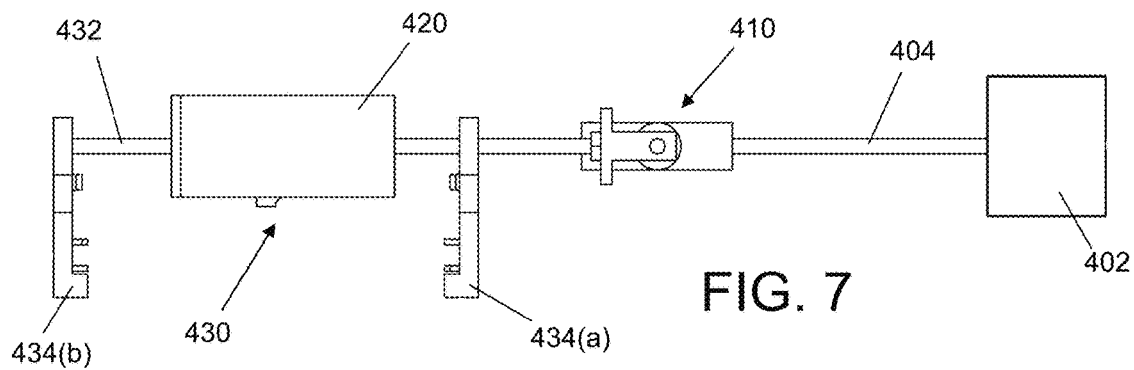
FIG. 7 is a side view of a load block pivot mount for use in the scratch test apparatus of FIG. 1.
Figure 8:
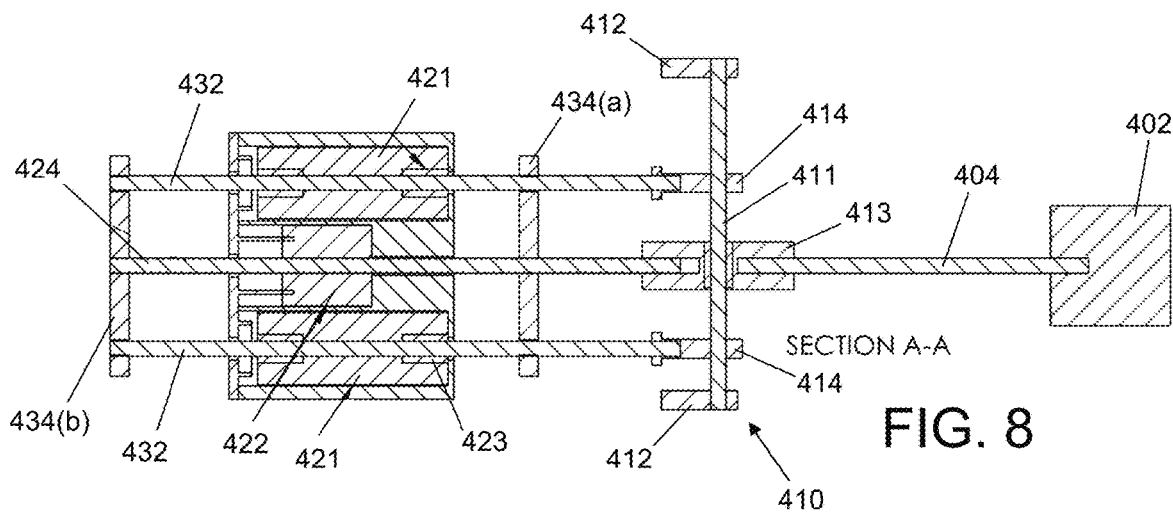
FIG. 8 is a top, sectional view of the load block pivot mount of FIG. 7 along section line A-A.
Figure 9:
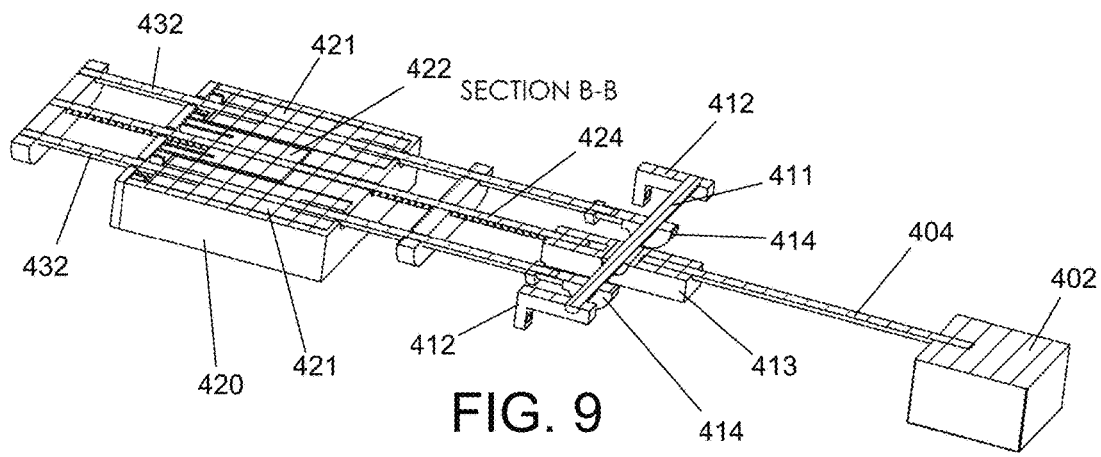
FIG. 9 is a perspective, sectional view of the load block pivot mount of FIG. 7 along section line B-B.

Next and with continuing reference to FIGS. 1-4 and the close-up view of FIGS. 7, 8 and 9, load assembly 400 includes load block 402 that is suspended from load block pivot mount 413 via load block support rod 404, counterweight carrier 430 that is suspended from load block pivot mount 413 via counterweight slider rods 432, and counterweight assembly 420 that is linearly moveable along counterweight carrier 430. Each of the foregoing components is described in detail below.

Load block 402 comprises a solid block with a holder for stylus 410. Stylus 410 may be joined to load block 402 via a threaded connection or such other connection as may occur to those skilled in the art, but preferably in each case in a manner that will enable removal of stylus 410 from load block 402 as may be desirable for scratch testing of varied surfaces. Likewise, load block 402 may be provided a connector (such as multiple threaded channels at different angles on the underside of load block 402) that enables stylus 410 to extend from the bottom of load block at one of multiple angles. This enables a scratch test to be carried out with the stylus in differing angular orientations, as may be desirable in differing scratch tests in order to simulate differing conditions that a subject surface or material may ultimately experience when in use.

Load block pivot mount 413 includes a pivot mount rod 411 that is mounted to vertical frame members 216 at pivot mounting brackets 412. Pivot mount block 413 is positioned centrally along pivot mount rod 411 and is fixed to pivot mount rod 411 such that it pivots along with pivot mount rod 411. A first side of pivot mount block 413 faces load block 402, and receives (e.g., via a threaded connection) load block support rod 404, an opposite end of which is attached (e.g., via a threaded connection) to load block 402. A second, opposite side of pivot mount block 413 faces counterweight 430, and rotatably receives therein a front end of counterweight drive screw 424, discussed further below. Load block pivot mount 413 also includes slider rod pivot connectors 414 which likewise are affixed to pivot mount rod 411 and thus rotate along with pivot mount rod 411. An end of each slider rod pivot connector 414 that faces counterweight 420 receives therein a counterweight slider rod 432 (e.g., via a threaded connection).

Next, counterweight carrier 430 includes a front-end plate 434(a) and a rear end plate 434(b). Rear end plate 434(b) mounts each counterweight slider rod 432 (e.g., via a threaded connection) and rotatably mounts the rear end of counterweight drive screw 424. Likewise, front end plate 434(a) rotatably receives counterweight drive screw 424, and provides additional front-end support to each counterweight slider rod 432 that likewise extend through front end plate 434(a). Preferably, a counterweight carrier connecting arm 435 extends between a bottom of each of front-end plate 434(a) and rear end plate 434(b), and may include a cable guide 436 for maintaining electrical cables that extend into counterweight assembly 420. Additionally, each of front end plate 434(a) may be provided a front counterweight stop switch 437(a), and rear end plate 434(b) may be provided a rear counterweight stop switch 437(b), each of which may signal the controller to stop driving the motor drive 422 in counterweight assembly 420 when its outer housing reaches the limit end of its intended travel within counterweight carrier 430.

Finally, counterweight 420 includes counter loads 421, with each counterweight slider rod 432 extending through one of counter loads 421 to allow sliding of such counter loads 421 (and all of counterweight 420) along counterweight carrier 430. Preferably, counter loads 421 include bearings to aid in easy sliding of counter loads 421 along counterweight carrier 430. Counterweight 420 also includes motor drive 422, such as by way of non-limiting example a NMA 17 stepper motor, which may be combined with a ball nut of traditional configuration such that rotation of counterweight drive screw 424 by motor drive 422 causes linear movement of counterweight 420 along counterweight carrier 430, sliding along counterweight slider rails 432 during such linear movement. As noted above, the position of counterweight 420 along counterweight carrier 430 determines the load on stylus 410. With this configuration, the load on stylus 410 may be varied using a computer interface (not shown) without any manual intervention. Further, this configuration provides distributed loads over a relatively wide area to produce a sturdy design that may reduce measurement error. Still further, this configuration enables an operator to preset the desired load by programmatically fixing the position of the counterweight 420 to perform the scratch test under a fixed load state.

Figure 10:
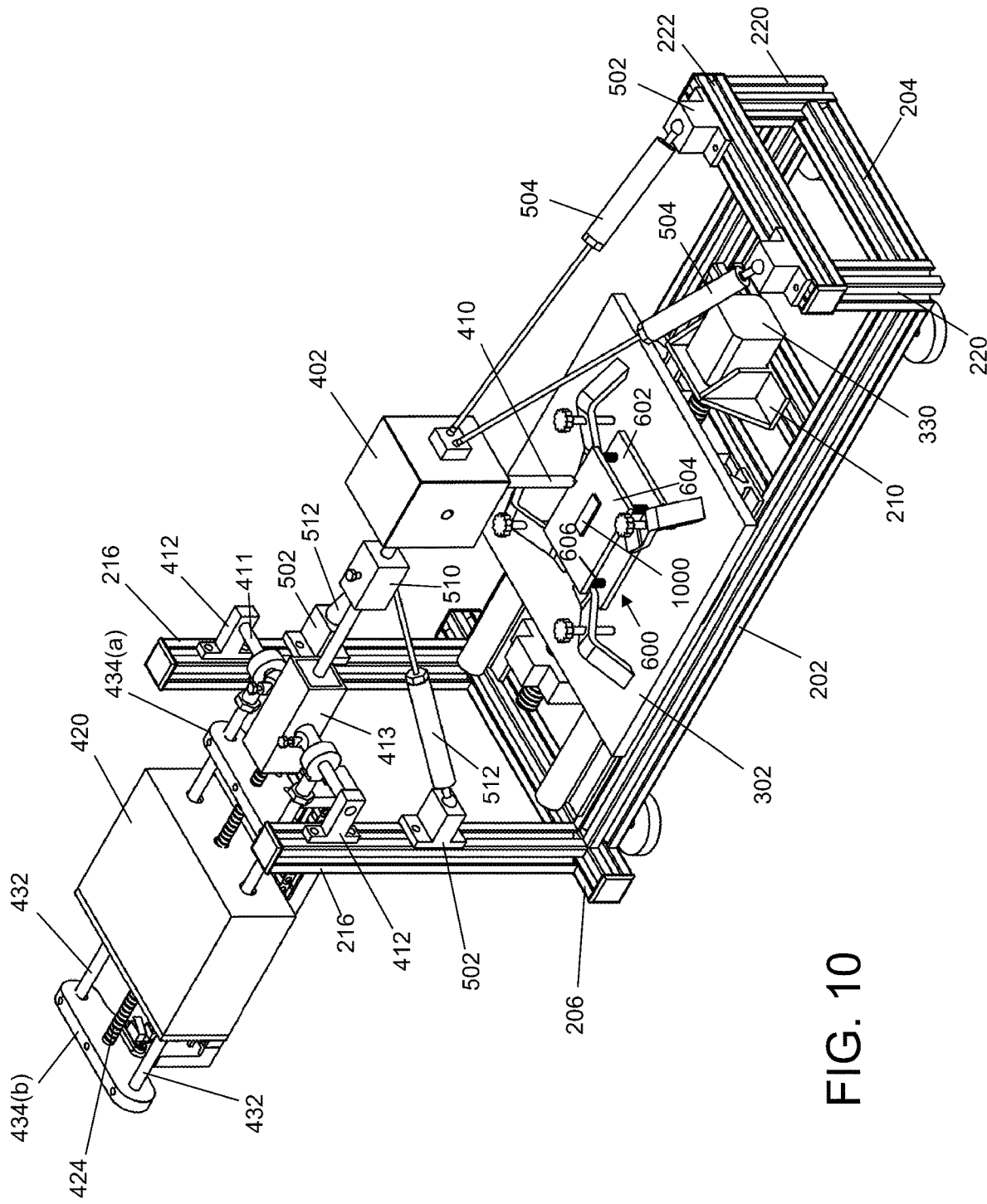
FIG. 10 is a front perspective view of a scratch test apparatus according to further aspects of an embodiment of the invention.
Figure 11:
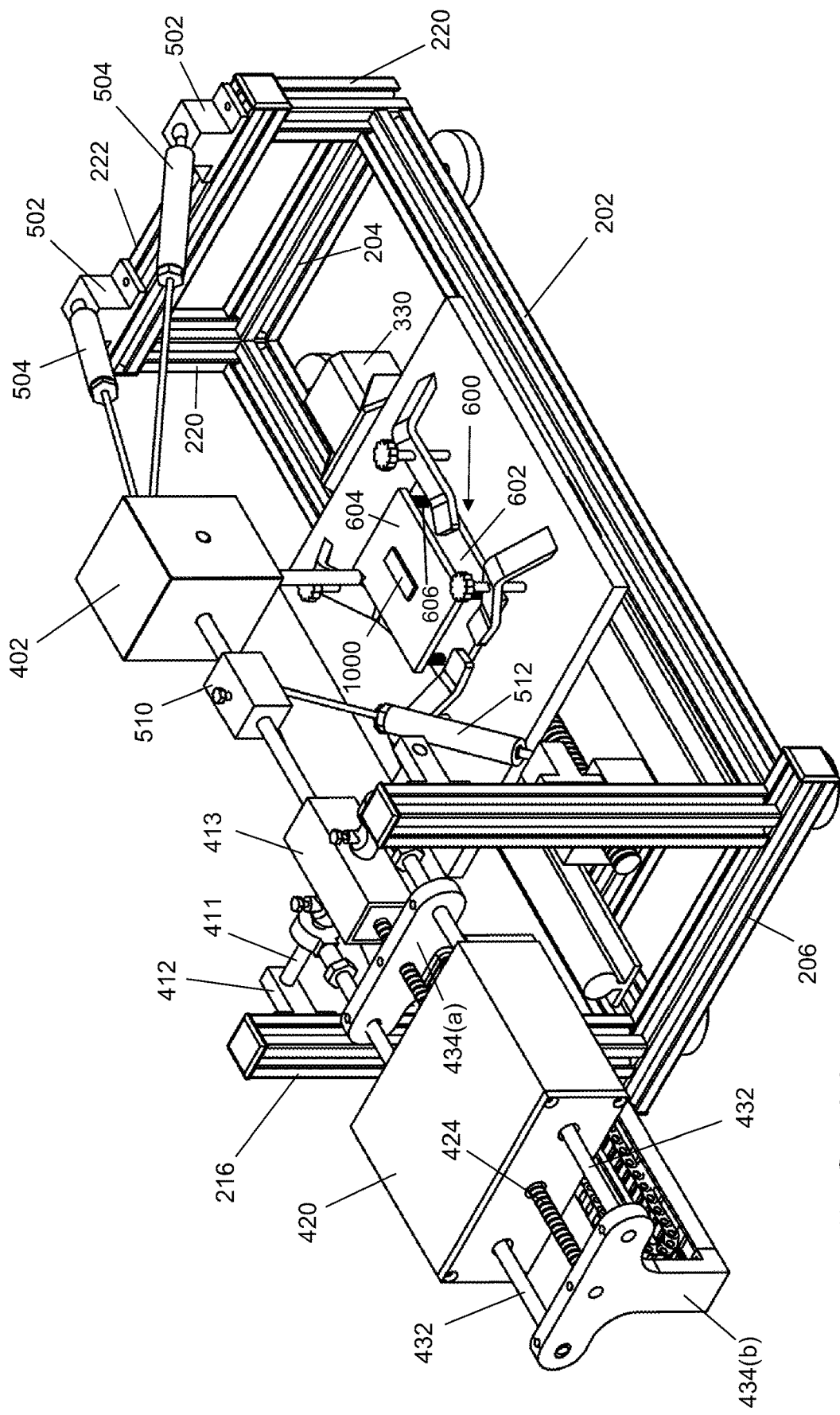
FIG. 11 is a rear perspective view of the scratch test apparatus of FIG. 10.
Figure 12:
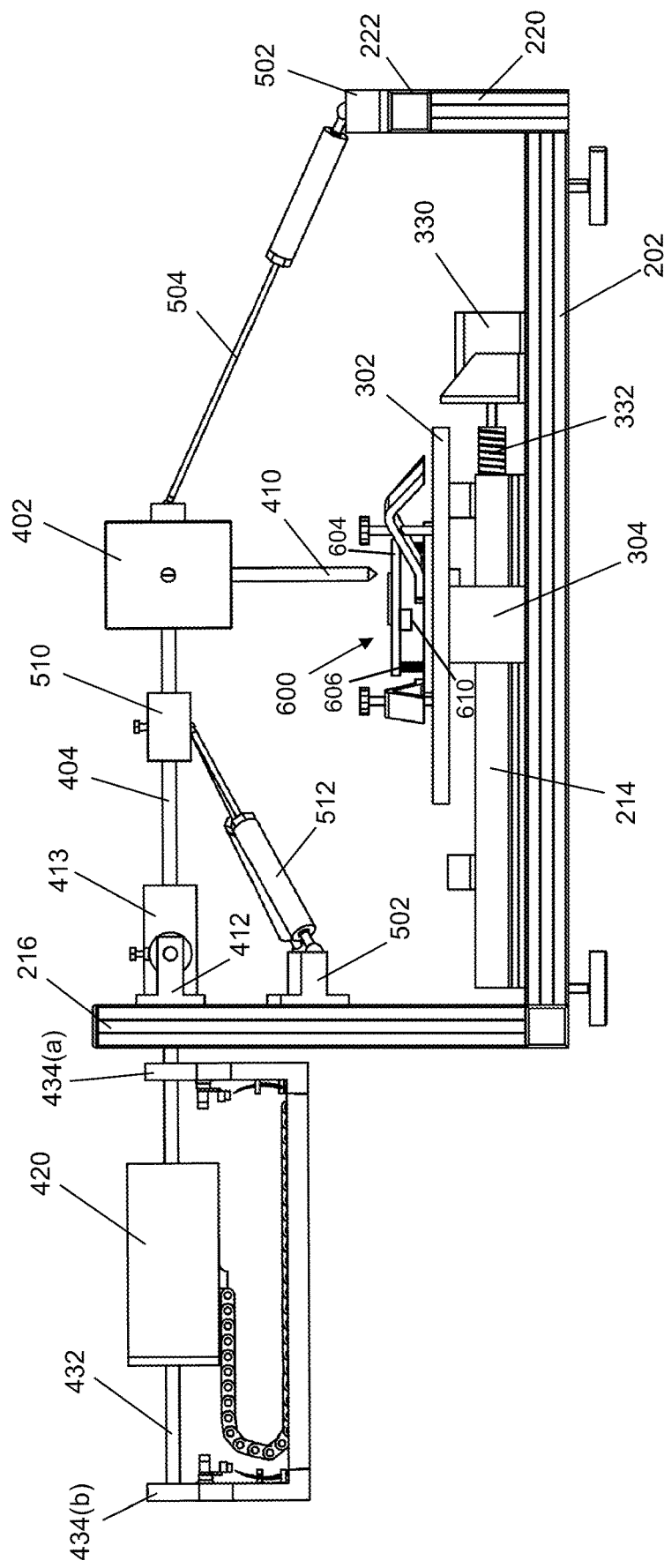
FIG. 12 is a side view of the scratch test apparatus of FIG. 10.

In accordance with further aspects of an embodiment of the invention, FIGS. 10-12 show a scratch test apparatus 100 with added features that offer additional load stabilization during a scratch test. In this configuration, frame 200 includes front vertical frame members 220 extending upward from front end leg 204, and a frame front spring support member 222 extending horizontally between front vertical frame members 220. Spring support brackets 502 are mounted to the top face of frame front spring support member 222, and each spring support bracket 502 receives an end of a primary load block spring 504, such as a gas spring of standard configuration. The opposite end of each primary load block spring 504 is in turn attached to a front face of load block 402. Primary load block springs 504 serve to reinforce stylus 410 so as to reduce the risk of skipping and jumping during a scratch test. It is noteworthy that skipping and jumping of a stylus in a scratch test generally occurs when scratches are created with high speed, which skipping and jumping may be mitigated with primary load block springs 504, even when scratch test apparatus 100 is operated to form a scratch at a high speed. Further, primary load block springs 504 may be particularly helpful in scratch testing of metallic samples, in which case the metallic coatings typically exhibit high resistance to scratching and often significant jumping and skipping of the stylus. Further, on metallic samples undergoing a scratch test, the requirement for the applied scratching load is generally high (approximately 10 N). Thus, it is expected that part of the desired load may come from the use of primary load block springs 504, with the remain part of the desired load coming from the counterweight 420.

With continued reference to FIGS. 10-12, further stabilization and load control may be obtained by way of secondary load block 510 that may be mounted on load block support rod 404, and optionally slidably mounted on load block support rod 404 so as to enable it to assume varied positions between load block pivot mount 413 and load block 402 (and thus further enabling adjustment of the ultimate load applied by stylus 410). In the event that secondary load block 510 is slidably mounted on load block support rod 404, a set screw may be provided to temporarily lock the position of secondary load block 510 along load block support rod 404. Further, secondary load block springs 512 may be provided, such as gas springs, mounted at a first end to a spring support bracket 502 on each vertical frame member 216, and at an opposite end to secondary load block 510. As with primary load block springs 504, secondary load block springs 512 serve to further reinforce stylus 410 so as to reduce the risk of skipping and jumping during a scratch test With continued reference to FIGS. 10-12, rather than positioning a test specimen 1000 flat on the top surface of test specimen support stage 300, in the event that it may be desirable to perform a scratch test while the specimen is vibrating, a vibration table 600 may be provided that may be positioned on the top surface of test specimen support stage 300 and held in a fixed positioned via test specimen clamps 306. Vibration table 600 may comprise a base 602 and an upper test specimen support panel 604 that is mounted to base 602 via one or more springs 606. A vibration module 610 (the construction of which is readily known to those of ordinary skill in the art) is preferably mounted to the underside of upper test specimen support panel 604 and imparts mechanical vibration to upper test specimen support panel 604, and thus to test specimen 1000. Such assembly may be used to simulate a realistic application environment, as many coated parts are applied in high vibration conditions. In order to understand the impact of mechanical vibrations on coating integrity for a particular coating, a user of scratch test apparatus 100 may induce controllable mechanical vibrations during scratching under constant load or variable load conditions.

Figure 13:
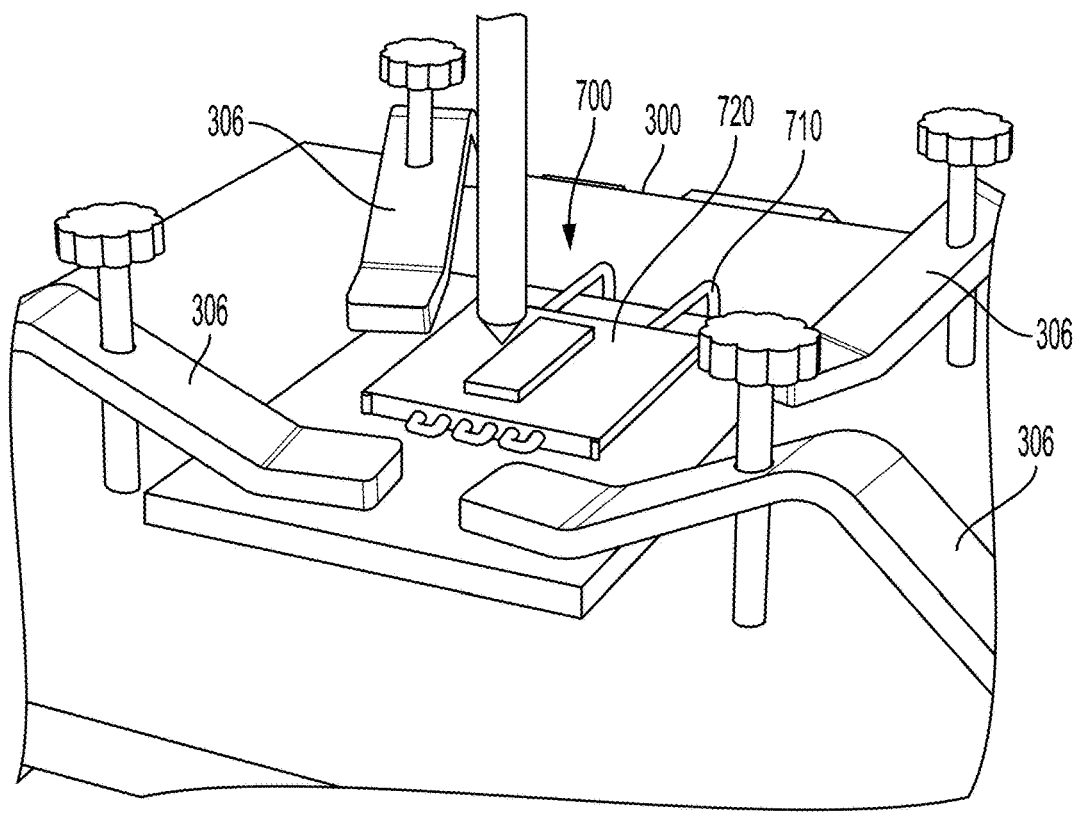
FIG. 13 is a close-up perspective view of a test specimen support stage of the foregoing Figures and including a variable temperature specimen support.

Further and with reference to FIG. 13, specimen 1000 may likewise be positioned on a variable temperature specimen support 700 that may likewise be positioned on the top surface of test specimen support stage 300 and held in a fixed position via test specimen clamps 306. Variable temperature specimen support 700 may include a heating resistor 710 extending through a panel of ceramic insulation 720 on which specimen 1000 is directly placed. With this configuration, the variable temperature specimen support 700 may then be heated to produce different temperatures, thus allowing variation of the temperature of sample 1000 to enable performance of scratch testing under different temperatures. The heating resistor 710 may be controlled via the programming in the controller (not shown) to produce cyclic thermal loading/stresses and perform scratch testing during each cooling and heating step.

Figure 14:
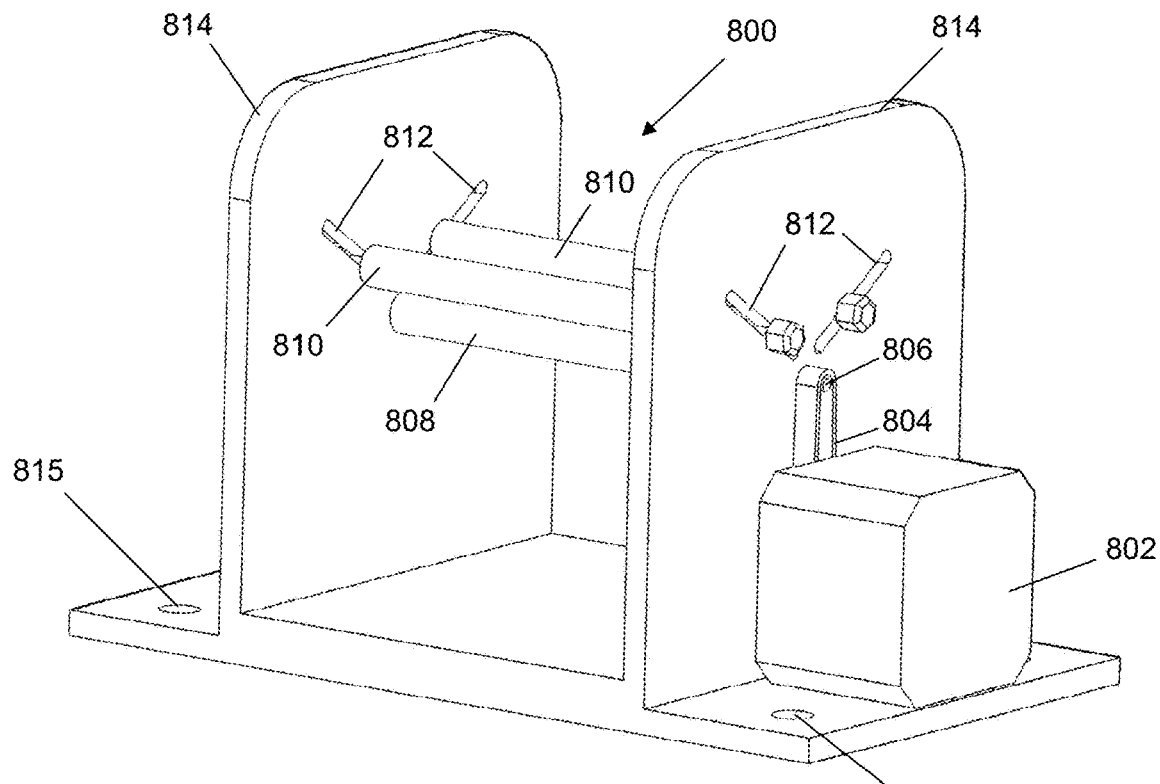
FIG. 14 is a perspective view of a cylindrical specimen support for use in the scratch test apparatus of the foregoing Figures.

Still further and with reference to FIG. 14, scratch test apparatus 100 may also receive a cylindrical specimen support 800 that may likewise be positioned on the top surface of test specimen support stage 300 and held in a fixed position via test specimen clamps 306, in order to enable scratch testing of a cylindrical sample having a coating. For example, one or more openings 815 may be provided in the base of cylindrical specimen support 800 that may receive threaded connectors, such as screws, bolts, or similarly configured connectors, for attaching cylindrical specimen support 800 to the rest of scratch test apparatus 100 (such as directly onto test specimen support stage 300). In this configuration, a drive motor 802 may turn a drive belt 804 to in turn rotate a drive pin 806. Drive pin 806 may be affixed to a cylindrical drive roller 808 in order to turn a cylindrical sample (not shown) when placed in cylindrical specimen support 800. Preferably, adjustable cylindrical test specimen supports 810 are provided to support the sides of the cylindrical test specimen when it is in contact with cylindrical drive roller 808. The ends of adjustable cylindrical test specimen supports 810 extend through slots 812 in each end wall 814 of cylindrical specimen support 800 so as to enable their position with respect to drive roller 808 to be adjusted to accommodate cylindrical test specimens of varying sizes. Such configuration may allow testing of coatings on non-flat test samples which may be rotated at varying speeds (in order to create a scratch at differing speeds) and under fixed or variable loads.

Optionally, in each of the configurations noted above, load block 402 may be provided a permanent or removable gyroscopic sensor in order to confirm that the relative motion of the head of stylus 410 with respect to the sample holder is maintained within a desired accuracy range, and to ensure reproducibility of scratch test results. The elimination or minimizing of factors that cause inaccurate measurements is fundamental for instrumentation design. Routine instrument calibration is one of the tasks to maintain instrument accuracy. The calibration process may configure the instrument to provide results like new or within an acceptable range. As one of the most sensitive parts of a scratch test apparatus that can lead to variations in test results is scratch head alignment and shift during the experiment, providing load block 402 with such a gyroscopic sensor will determine tilt angle to less than 0.1° tilt, thus ensuring maintenance of the desired accuracy range.

A scratch test apparatus 100 configured as above may provide a lightweight and highly compact assembly that may be easily transported from place to place by a user, such as in a small container such as a toolbox, automobile glove box, or the like. Further, a scratch test apparatus 100 configured as above may enable a scratch to be applied to a surface very slowly to understand any environmental impact on that coating (such as the impact of interactions between coating materials and environmental humidity or gases present in the area of scratch test apparatus 100 that might cause swelling or other delamination mechanisms).

In use, in situ and post-scratch analysis may be performed in order to develop quantitative measurements. A laser distance monitor and high-speed camera may be used to simultaneously provide quantitative information about scratch head linear displacement to less than 1 mm accuracy and video recording of scratch formation. Likewise, SEM or Keyence like meteorological microscopes may be applied for post-processing to measure scratch width, depth, and scratched material accumulation along the edges of the scratch to quantify the adhesion parameters using conventional equations or as per ASTM and ISO standards (ASTM D7027, ISO 1518, and ISO 12137-2). With the foregoing data, different frames can be combined to produce a full picture of the complete scratch length. One may then plot the load applied along the full scratch length to pinpoint the critical load necessary to create a scratch for a given test specimen under a particular set of conditions.

In accordance with further aspects of an embodiment of the invention, the programmable controller discussed above preferably controls the speed and distance travel of the test specimen support stage 300. A Python program sends instructions to system actuators to control movements of support stage 300 and counterweight 420. A graphical user interface may be provided using the PyQt plugin. PyQt is a Python binding for Qt, which is a set of C++ libraries and development tools that include platform-independent abstractions for a graphical user interface. Such application controls the length of the scratch and preferably displays the necessary instruction for each step.

Figure 15:
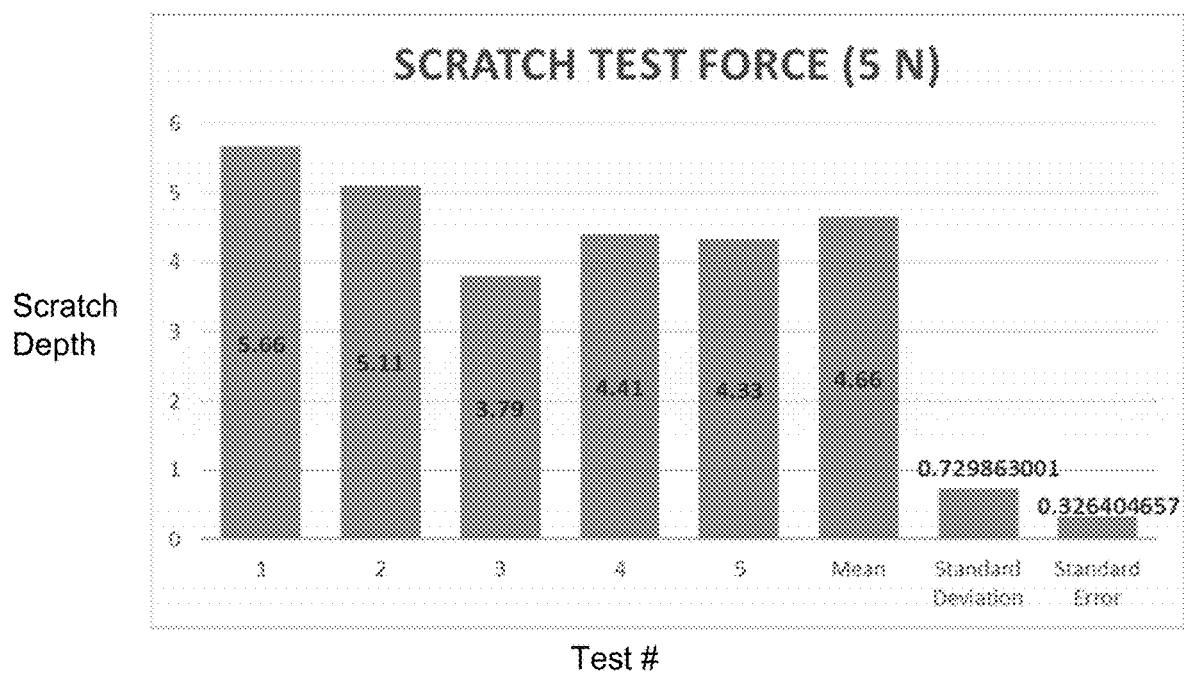
FIG. 15 is a chart showing scratch depth results over a series of five tests performed under a load of 5 N using a scratch test apparatus according to aspects of the invention.
Figure 16:
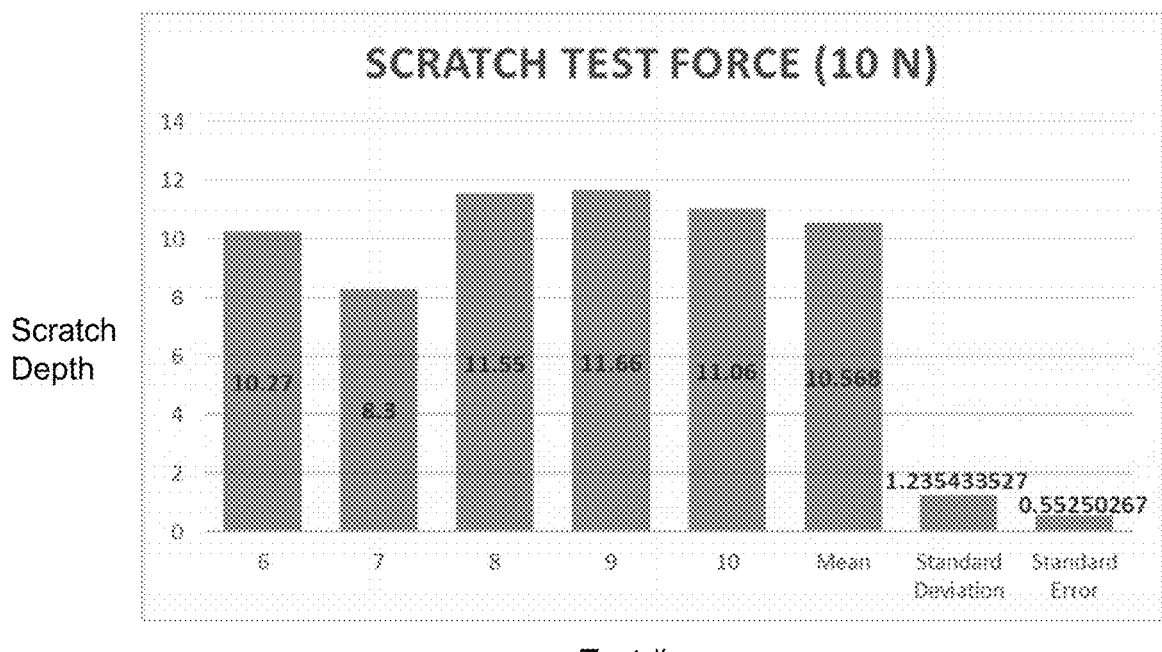
FIG. 16 is a chart showing scratch depth results over a series of five tests performed under a load of 10 N using a scratch test apparatus according to aspects of the invention.

Exemplary data generated from a scratch test is shown in FIGS. 15 and 16, representing a basic form of scratch test apparatus 100 as shown in FIG. 1 (i.e., without load variation of additional stylus head stabilization). Scratches were made using such scratch test apparatus 100 on a 316 stainless steel additively manufactured component. The scratches were analyzed using a VHX-Keyence microscope. Five scratches were produced at a 5 N load (FIG. 15), and another five scratches were produced at a 10 N load (FIG. 16). The charts of FIGS. 15 and 16 report depth of scratch in micrometers for each scratch. The results show that a scratch test apparatus 100 formed in accordance with aspects of the invention provides a highly flexible, durable, and repeatable scratch test platform. Specifically, the results (as reported in FIGS. 15 and 16) showed the following: sample #1 experienced an average scratch depth of 5.66 The average is taken from 30 different profilometer lines 30 µm apart from each other. For Sample #2 the stylus manages to make an average scratch depth of 5.11 The microscopic analysis showed that Sample #3 had a scratch depth of 3.79 The depth of scratch for samples #4 and #5 are 4.41 µm and 4.33 µm respectively. We observed an average depth of the scratch for a 5 N normal force scratch of 4.66 µm with a standard deviation of 0.7298 µm and standard error of 0.3264 For the second group of experiments, a 10 N normal force was applied. The microscopy image for sample #6 showed the stylus manages to make an average scratch depth of 10.27 Sample #7 experienced an average scratch depth of 8.3 which comprise 30 different profilometer lines. For sample #8, the stylus manages to make a scratch depth of 11.55 μm. For samples #9 and #10, the average depth of scratch is 11.66 μm and 11.06 μm respectively. The average depth of scratch for samples experiencing 10 N force is 10.568 μm with a standard deviation of 1.235 μm and a standard error of 0.5525 As indicated by those results, a scratch tester apparatus configured in accordance with aspects of the invention thus allows for the determination of the accurate load at which film starts to rupture, and enables testing at varied temperatures, under application of vibrations forces, and under varied other environmental challenges, all in a compact and economically configured apparatus.

One may further increase the reproducibility of test results and suppress noise incurred during a scratch test by employing the advanced support system disclosed herein, and more particularly by including load block spring 504 and secondary load block springs 512 as shown in FIGS. 10-12. As noted above, load block springs 504 and secondary load block springs 512 are configured to provide increased sturdiness during the scratching process performed by scratch test apparatus 100. The load block springs 504 and secondary load block springs 512 may be of critical importance in the event that vibrations are induced on the sample holder. In that event and with the added support of springs 504 and 512, sample vibratory motion will not adversely impact the scratch head position.

Having now fully set forth the preferred embodiments and certain modifications of the concept underlying the present invention, various other embodiments as well as certain variations and modifications of the embodiments herein shown and described will obviously occur to those skilled in the art upon becoming familiar with said underlying concept. It should be understood, therefore, that the invention may be practiced otherwise than as specifically set forth herein.

What is claimed is:

1. A scratch testing apparatus, comprising:
   a frame;
   a test specimen support stage moveably mounted on the frame;
   a scratch stylus mounted on a load assembly, the load assembly pivotably attached to the frame, the scratch stylus positioned to engage a specimen on the test specimen support stage so as to create a scratch on the specimen;
   an adjustable load configured to modify a vertical load applied to the scratch stylus, and slide rails directly mounted to the frame.

2. The scratch testing apparatus of claim 1, further comprising sliders mounted to an underside of the test specimen support stage and slidable along the slide rails.

3. The scratch testing apparatus of claim 1, further comprising a drive screw motor mounted to the frame, and a drive screw extending from the drive screw motor and engaging a ball nut mounted to an underside of the test specimen support stage to horizontally move the test specimen support stage upon rotation of the drive screw.

4. The scratch testing apparatus of claim 1, the load assembly comprising a load block pivot mount pivotably attached to the frame.

5. The scratch testing apparatus of claim 4, the load assembly further comprising a load block rigidly mounted to the load block pivot mount, wherein the stylus extends from a bottom face of the load block.

6. The scratch testing apparatus of claim 5, wherein the stylus is removably mounted to the load block.

7. The scratch testing apparatus of claim 6, wherein the stylus may be positioned at varying angles with respect to the load block.

8. The scratch testing apparatus of claim 5, further comprising at least one primary load block spring extending between the frame and the load block.

9. The scratch testing apparatus of claim 5, further comprising an adjustable secondary load block positioned between the load block and the load block pivot mount.

10. The scratch testing apparatus of claim 9, further comprising at least one secondary load block spring extending between the frame and the secondary load block.

11. The scratch testing apparatus of claim 4, the adjustable load further comprising a counterweight movably mounted to the load block pivot mount and moveable toward and away from the load block pivot mount to change the total vertical load applied to the scratch stylus.

12. The scratch testing apparatus of claim 11, further comprising a drive screw motor in the adjustable load and a drive screw extending from the drive screw motor, the drive screw engaging a ball nut affixed to the adjustable load to selectively move the counterweight toward or away from the load block pivot mount.

13. The scratch testing apparatus of claim 12, further comprising a front counterweight stop switch and a rear counterweight stop switch configured to stop movement of the counterweight upon contact between the counterweight and either of the front counterweight stop switch and the rear counterweight stop switch.

14. The scratch testing apparatus of claim 1, further comprising a specimen support configured for removable placement on the test specimen support stage and to position a specimen thereon and below the scratch stylus.

15. The scratch testing apparatus of claim 14, said specimen support further comprising a heating element configured to modify the temperature of a specimen positioned on the specimen support.

16. The scratch testing apparatus of claim 14, said specimen support further comprising a vibration module configured to impart vibrations to a specimen positioned on the specimen support.

17. The scratch testing apparatus of claim 14, said specimen support further comprising a cylindrical specimen support having a rotatably driven roller and a plurality of adjustable cylindrical test specimen supports, wherein said cylindrical specimen support is configured to horizontally position and rotate a cylindrical test specimen positioned on the cylindrical specimen support.

18. A scratch testing apparatus, comprising:
   a frame having a horizontal portion and a vertical portion;
   a test specimen support stage moveably mounted on said horizontal portion of the frame, and a stepper motor rotating a drive screw that engages the test specimen support stage to move said specimen support stage upon rotation of the drive screw; and
   a load block pivot mount pivotably mounted to the vertical portion of the frame, the load block pivot mount having a load block rigidly attached to the load block pivot mount, the load block mounting a scratch stylus in a direction of the test specimen support stage, and
   a counterweight moveable toward and away from the load block pivot mount to modify a vertical load that is applied to the scratch stylus.

* * * * *